United States Patent Office 3,375,289
Patented Mar. 26, 1968

3,375,289
METHOD FOR PREPARATION OF DIVINYLBENZENES
Khachik Egorovich Khchejan, Ninel Josifovna Jakovich, Alexei Fedorovich Pavlichev, and Larisa Borisovna Izrael, Moscow, U.S.S.R., assignors to Nauchno-Issledovatelsky Institute Sinteticheskikh Spirtov i Organicheskikh Produktov, Moscow, U.S.S.R.
No Drawing. Filed Jan. 12, 1965, Ser. No. 425,045
19 Claims. (Cl. 260—669)

ABSTRACT OF THE DISCLOSURE

The method of subjecting diethylbenzenes to oxidation with oxygen-containing gases to yield diacetylbenzenes, reducing catalytically the diacetylbenzenes thus formed, and thereafter dehydrating, in the presence of a dehydration catalyst, the bis-($\alpha$-hydroxyethyl)-benzene formed to yield divinylbenzenes.

---

This invention relates to a method for production of vinyl aromatic and divinyl aromatic compounds, as well as of their individual isomers, with a high grade of purity and relates more specifically to obtaining the divinylbenzene and its separate individual isomers.

Hitherto vinyl aromatic and divinyl aromatic compounds have been produced in accordance with a known industrial method by catalytic dehydrogenation of ethyl aromatic and diethyl aromatic compounds, in particular, of diethylbenzene in steam flow at a temperature of 630–650° C.

After dehydrogenation of diethylbenzene the resulting product is a 20–25% mixture of divinylbenzene isomers with styrene, ethylvinylbenzene and other compounds.

Isolation of divinylbenzene from diethylbenzene dehydrogenation products is carried out by rectification, the commercial product of which is a fraction, comprising a concentrate of a 45–50% mixture of divinylbenzene isomers.

More pure products can hardly be obtained for a number of reasons: (1) due to proximity of the boiling temperatures of diethylbenzene isomers which are being used as a starting material; (2) due to the absence of a selective dehydrogenating catalyst, and (3) due to the fact that diethylbenzene dehydrogenation products are too readily subject to polymerization.

Attempts made to overcome said difficulties have proven inadequate, while we have solved this problem successfully and brought it to practical realization.

In accordance with our invention, in a broad sense, divinyl aromatic compounds in the form of a mixture of isomers are obtained with a high yield from diethylbenzene and at a higher purity grade; at the same time individual meta- and para-isomers of divinylbenzene of a high purity grade (close to 100%) are obtained.

The method of production of divinylbenzene and its isomers comprises the following three stages of the process: oxidation, reduction, and dehydration.

At the first stage of the proposed method the starting product, i.e., diethyl aromatic compounds, is oxidized with air oxygen to diacetylaromatic compounds followed by fractionating them into isomers. Thereafter at the second stage diacetylaromatic compounds are reduced to bis-($\alpha$-hydroxyethyl)-aromatic compounds, which then at the third stage are subjected to dehydration for preparation of divinyl aromatic compounds.

The present invention has a special application—it has for its object the use of divinylbenzene of a high grade of purity for the synthesis of high-quality resins, and also the preparation of resins used for chromatographic purposes, and, in addition to the above, the use of individual isomers of divinylbenzene, in particular the para-isomer for production of organic dielectrics and semiconductors.

An object of this invention is to provide an industrial method for preparation of a mixture of divinylbenzene isomers (para- and meta-) of high-grade purity, close to 100%, with an increased yield (60% by weight approximately) in relation to the starting material.

Another object of the present invention is to provide an industrial method for preparation of an individual isomer of divinylbenzene, i.e. para-divinylbenzene of highgrade purity, close to 100%.

Still another object of the present invention is to provide an industrial method for preparation of another individual isomer of divinylbenzene, i.e. meta-divinylbenzene of high-grade purity, close to 100%.

Our invention makes it possible to obtain highly, almost 100%, purified divinylbenzene as well as individual isomers of divinylbenzene (meta- and para-divinylbenzenes) with a total yield (from diethylbenzene) exceeding 60% and with a grade of purity close to 100%.

In accordance with said and other objects of the present invention, it is carried out as shown below and presented in the appended claims. It will be understood that embodiments of the invention, other than those described therein as well as modifications in the exact way of performing it, employing the same or equivalent principles may be used within the scope of the invention presented to be patented without departing from the true idea of the invention.

Other objects and advantages will be apparent from the following detailed description of the method for preparation of a mixture of divinylbenzene isomers and also of its separate individual para- or meta-isomers of high purity, in accordance with which the process of their preparation is carried out in three stages in the following way.

At the first stage of the process oxidation of diethylbenzenes is carried out with air oxygen in the presence of a catalyst, salts of metals with variable valence; it is also possible to use cobalt salts. Along with this it is also possible to use for said purposes soluble manganese salts.

The oxidation process of diethylbenzene with air is conducted to formation of an intermediate product, i.e. diacetylbenzenes, at 100–130° C., preferably at 110–115°.

Isolation of diacetylbenzenes from diethylbenzenes oxidation products is carried out by rectification and as a result diacetylbenzenes are obtained in the form of a mixture of isomers.

In order to obtain individual isomers of, separately, para- or meta-divinylbenzene, a fraction of the intermediate product, i.e. diacetylbenzene, is cooled to a temperature below 30° C., as a result of cooling, crystals of para-diacetylbenzene are formed, which are filtered off; further purifying of crystals is carried out by recrystallization from solvents: methanol, acetone, etc.

The remaining mother liquor is mainly metadiacetylbenzene. Isomers of diacetylbenzene can be also isolated by complete rectification.

At the second stage of the process reduction of diacetylbenzenes is carried out to formation of secondary intermediate products, i.e. bis-($\alpha$-hydroxyethyl)-benzenes.

Reduction of diacetylbenzenes may be carried out by a secondary alcohol in the presence of aluminum alcoholate of the appropriate alcohol, and also by hydrogen in the presence of hydrogenation catalysts, i.e. Raney nickel with additives of alkali or chrome-nickel catalyst, etc.

The term "chrome-nickel catalyst" as used in this specification is utilized in the same sense as set forth in the article by Zanozina et al. entitled, "Adsorption and Catalytic Properties of Nickel-Chrome Catalysts," published by the Kazaakh Institute of Technology, Chemical Institute of AnKaz, U.S.S.R., in 1963.

Reduction of diacetylbenzene by secondary alcohol in the presence of aluminum alcoholate provides selectivity of carrying out the reduction reaction, according to which a minimum amount of by-products is secured and a high yield (94–96%) of the aimed intermediate product, i.e. bis-($\alpha$-hydroxyethyl)-benzene of 97–99% purity close to 100%, is obtained.

The isolation of reduction products, bis-($\alpha$-hydroxyethyl)-benzene, is carried out with aqueous solution of secondary alcohol, the desired product passing into the solution, the aluminum alcoholate turning into aluminum hydroxide and falling out as a precipitate which is then filtered off. The secondary alcohol is distilled off from the solution.

The residue is a desired secondary intermediate product, bis-($\alpha$-hydroxyethyl)-benzene, of 98–99% purity with 95–96% yield. The use of a chrome-nickel catalyst also provides adequate selectivity of the reduction process. At the same time the catalyst is an industrial one and is not so pyrophorous as the Raney nickel.

When reduced in the presence of a chrome-nickel catalyst, the obtained bis-($\alpha$-hydroxyethyl)-benzenes have purity of 97–98%; the yield is 94–95%.

At the third stage of the process dehydration of the secondary intermediate product, i.e. bis-($\alpha$-hydroxyethyl)-benzenes, is carried out to divinylbenzenes in the presence of activated aluminum oxide or in the presence of the dehydrating catalyst, proposed by us, i.e. magnesium sulphate, in an inert gas flow (carbon dioxide or nitrogen) at a temperature ranging from 280 to 450° C. and at a residual pressure of 100 mm. Hg.

The magnesium sulphate catalyst, due to its neutrality does not interact with the contacting products and the condensation or polymerization processes do not take place in its presence, which stipulates the selectivity and tendency of the catalyst for activity during the dehydration process thus providing for easiness of its exploitation and long service-life.

The end product obtained after dehydration contains 95–97% of divinylbenzene with a yield of 80–90%.

A higher purity of divinylbenzenes (of the order of 100%) is attained by distillation of the dehydration products in the presence of an inhibitor, i.e. an hydroquinone, or without it, at a residual pressure of 2–4 mm. Hg.

The possibility of preparation of a highly purified divinylbenzene product close to 100% purity is provided by the difference of about 100° in the boiling temperatures between the divinylbenzene and the admixtures contained therein, the diacetylbenzenes and the bis-($\alpha$-hydroxyethyl)-benzenes.

When carrying out the present invention it is preferable to carry out the process under the following conditions:

At the first stage it is expedient to carry out the oxidation of diethylbenzene with air oxygen at 110–115° C.

At the second stage-reduction to bis-($\alpha$-hydroxyethyl)-benzenes it is preferable to introduce the components in to the following ratio: the secondary alcohol in relation to the diacetylbenzene is taken in a ratio (in moles) of 12:1; the aluminum alcoholate (on conversion to aluminum) to the diacetylbenzenes is taken in a ratio (in moles) of 0.3:1. Reduction may be carried out by hydrogenation of diacetylbenzenes on a chrome-nickel catalyst at 20 to 100° C. under pressure of up to 100 atm.

At the third stage it is preferable to carry out the dehydration at 300–320° C.

For a better understanding of the present invention by those skilled in the art the following examples are given below by way of illustration.

*Example 1*

95 g. of diethylbenzene (comprising ca. 65% of a meta-isomer and 30% of a para-isomer) are mixed with 63 g. of a wide fraction of an ethyl acetophenone, distilled off from an oxidate on a rectifying column at 120–126° C. in the top part of the column and under a residual pressure of 20 mm. Hg. The obtained mixture is oxidized with air oxygen for 12 hours on a bubbler column at 110–115° C. in the presence of 1 g. of cobalt stearate. After 28 g. of water evolved the oxidation is stopped.

This experiment leads to a discharge of 176 g. of a dark-yellow oxidate. Out of this amount of oxidate 63 g. of ethylacetophenone is collected on the rectification column, charged back into the bubbler column for oxidation. 111 g. of the still product is subjected to distillation.

A fraction of diacetylbenzene, amounting to 89 g., is isolated at 120–130° C. in the top part of the column and under residual pressure of 2 mm. Hg. The residue in the flask is 19 g. of acids and resins.

*Example 2*

104 g. of diethylbenzene, enriched to 60% with a para-isomer on a laboratory column of 30 theoretical plates, and 69 g. of ethylacetophenone are oxidized with air oxygen under conditions similar to those described in Example 1.

30 g. of water evolved, 191 g. of dark-yellow oxidate is discharged. Treatment of the oxidate is effected in a manner similar to that described in Example 1.

69 g. of a wide fraction of ethylacetophenone and 97 g. of diacetylbenzene fraction are isolated from the oxidate. When the diacethylbenzene fraction is cooled to +5° C. crystals of para-diacetylbenzene, amounting to 58 g., fall out. After recrystallization of the latter from methanol 50 g. of para-diacetylbenzene (M.P. 113–114° C.) are obtained. 4 g. of para-diacetylbenzene and 27 g. of meta-diacetylbenzene with M.P. 28.0–30° C. are obtained from the mother liquor by fractional crystallization.

*Example 3*

The reduction process is carried out by charging a two-necked reactor, connected to a laboratory column with 21 g. (0.35 mol) of isopropyl alcohol, containing 0.8 g. of aluminum isopropylate (on conversion to aluminum).

15.5 g. (0.096 mol) of a mixture of diacetylbenzene isomers, dissolved in 47 g. (0.78 mol) of dehydrated isopropyl alcohol is fed into a reaction vessel through a dropping funnel in the course of reaction. The temperature in the vessel is maintained at 90° C.; at a 7 to 9 reflux ratio 10.3 g. of acetone, i.e. 93% of theoretical content is collected.

When the reaction is complete the still product is washed with aqueous isopropyl alcohol, the end product, i.e. bis-($\alpha$-hydroxyethyl) benzene, passes into the solution, and the aluminum isopropylate turns into Al(OH)$_3$ and precipitates. The precipitate is filtered off on a vacuum filter, and the alcohol is distilled off from the mother liquor. 15.7 g. of partly crystallized mixture of bis-($\alpha$-hydroxyethyl)-benzenes are obtained as the residue. Purity of bis-($\alpha$-hydroxyethyl) benzene is 98.0%; the yield is 97.0% of theory.

*Example 4*

162 g. (1 mole) of para-diacetylbenzene (M.P. 113–114° C.) are charged into the reaction vessel simultaneously with 146 g. (2.3 moles) of isopropyl alcohol; the remaining 582 g. (9.7 moles) of alcohol and 9 g. (0.33 mol) of aluminum isopropylate are fed into the reaction vessel through a funnel in the course of reaction. The temperature in the reaction vessel is maintained at 90° C. at a 7 to 9 reflux ratio 14.18 g. of acetone is collected, i.e. 95.7% of theory.

Isolation of para-bis-($\alpha$-hydroxyethyl)-benzene is also effected in the same manner as that of the mixture of isomers of bis-($\alpha$-hydroxyethyl)-benzenes (see Example 3). After distilling off isopropyl alcohol from the mother liquor there is formed a white crystalline substance, para-bis-($\alpha$-hydroxyethyl)-benzene in an amount of 160 g.

which melts at 80°–82° C. Purity of the obtained para-bis-(α-hydroxyethyl)-benzene is 99%. Yield: 95.6% of theory.

Example 5

Into a two-necked reaction vessel 21 g. (0.35 mol) isopropyl alcohol, containing 0.8 g. of aluminum isopropylate (on conversion to aluminum) and 16.2 g. (0.1 mol) of meta-diacetylbenzene (M.P. 28–30° C.) are charged, dissolved in 51 g. (0.85 mol) of absolute isopropyl alcohol. The temperature in the vessel is maintained at 90° C. At a 7 to 9 reflux ratio 10.8 g. of acetone is collected, i.e. 93.2% of theory.

Isolation of meta-bis-(α-hydroxyethyl)-benzenes is carried out in the same way as that of the mixture of isomers of bis-(α-hydroxyethyl)-benzenes (see Example 3).

After the isopropyl alcohol distillation from the mother liquor a white crystalline substance with a M.P. 92–94° C. is formed.

According to literature the melting point is 96° C. The purity of the product is 97%; the yield is 94% of theory.

Example 6

Into a two-necked reaction vessel 16.2 g. (0.1 mol) of para-diacetylbenzene (M.P. 113–114° C.), and 20.0 g. (0.3 mol) of dehydrated secondary butyl alcohol are charged. The remained quantity of alcohol 69 g. (0.9 mol), containing 0.8 g. (0.03 mol) of aluminum butylate (on conversion to aluminum) is fed to the vessel through a funnel in the course of reaction.

The temperature in the vessel is maintained at 110° C. At a 7 to 9 reflux ratio 13.2 g. of methyl ethyl ketone is collected, i.e. 91.7% of theory.

Isolation of para-bis-(α-hydroxyethyl)-benzene is carried out in the same manner as that described in Example 3.

After the secondary butyl alcohol distillation from the mother liquor of 15.8 g. of para-bis-(α-hydroxyethyl)-benzene in the form of a white crystalline substance is formed; this substance melts at 80°–82° C. The purity of the obtained para-bis-(α-hydroxyethyl)-benzene is 97.5%; the yield is 92.7% of theory.

Example 7

Into a hydrogenation reaction vessel, mounted on a rocker 2.5 g. of Raney nickel catalyst and 30 ml. of methanol are placed. The catalyst is prepared according to a conventional method from a 50% alloy. After the saturation of the catalyst with hydrogen 10 g. of para-diacetylbenzene and 0.6 ml. of 10% methanol NaOH solution are charged into the vessel. Reduction is carried out by hydrogen at room temperature and under atmospheric pressure. The reaction takes 1 hour and 20 minutes. After the completion of the reaction the catalyst is filtered off, and the methanol distilled from the mother liquor. In the residue 10.2 g. of white crystalline para-bis-(α-hydroxyethyl)-benzene are obtained.

Purity of para-bis-(α-hydroxyethyl)-benzene is 97.8%; the yield is 97.5%.

Example 8

A metal reaction vessel, placed on a rocker, is charged with 5 g. of para-diacetylbenzene dissolved in 30 ml. of methanol, and 1.75 g. of a chrome-nickel catalyst, containing 50% of nickel. The catalyst is preliminarily activated by hydrogen for 2 hours at a temperature of 280° C.

Reduction is carried out with hydrogen at 90° C. and under a pressure of 15 or 30 atm.

The reaction is run correspondingly for one hour and forty minutes. On completion of the reaction the catalyst is filtered and the methanol is distilled off from the mother liquor.

In the residue 4.9 g. of para-bis-(α-hydroxyethyl)-benzene is obtained as a white crystalline substance. The purity of para-bis-(α-hydroxyethyl)-benzene is 98.0%; the yield is 94%.

Example 9

To effect dehydration of 5.06 g. of a melted mixture of isomers of bis-(α-hydroxyethyl)-benzenes are fed at a rate of 0.2 g./min. into a reaction tube with a 20 mm. diameter, previously filled with magnesium sulphate, dried to a constant weight, which acts as a catalyst.

The diameter of the catalyst grain is 3–5 mm., the volume is 30 ml.

The reaction temperature is maintained at 300–320° C.

The reaction is carried out in carbon dioxide gas flow in vacuo under a residual pressure of 14 mm. Hg.

In the first receiving vessel, cooled with ice, is collected a colourless liquid, a mixture of divinylbenzene isomers amounting to 3.67 g.; water is collected in the second receiving vessel, cooled with Dry Ice.

The purity of the obtained divinylbenzene is 96.4%; the yield is 89% of theory.

Example 10

Into a reaction tube, filled with magnesium sulfate, are charged 5.09 g. of melted para-bis-(α-hydroxyethyl)-benzene at a rate of 0.2 g./min. The reaction temperature is maintained at 320° C. The reaction is carried out in nitrogen gas flow under residual pressure of 15 mm. Hg.

The conditions of carrying out dehydration are the same, as those described in Example 9.

White para-divinylbenzene, which instantly crystallizes is collected mainly in the first receiving vessel, cooled with ice, and water is collected in the second receiving vessel cooled with Dry Ice. After separation from the water in a heated funnel 3.86 g. of para-divinylbenzene is obtained.

The purity of paradivinylbenzene is 97.8%; the yield is 97.0% of theory.

Refractive index $n_D^{40}$=15820; according to the literature data $n_D^{40}$=1.582. M.P. 25–27° C.

Example 11

5.0 g. of melted para-bis-(α-hydroxyethyl)-benzene are fed at a rate of 0.14 g./min. into a reaction tube filled with magnesium sulfate dried to a constant weight. The diameter of the catalyst grains is 3–5 mm. The catalyst volume is 30 ml. The temperature of the reaction is maintained at 400° C.

The reaction is carried out in vacuo under a residual pressure of 10 mm. Hg in carbon dioxide gas flow.

In the first receiving vessel, cooled with ice, there is collected, mainly, para-divinylbenzene, which instantly crystallizes. In the second receiving vessel, cooled with Dry Ice, water is collected.

After separation in a heated funnel 3.55 g. of para-dinvinylbenzene are obtained.

The purity of the obtained product is 91.7%; the yield is 83.7%.

M.P. is 23–26° C.; the refractive index $n_D^{40}$ is 1.5828.

Example 12

5 g. of melted meta-bis-α-hydroxyethyl)-benzene are fed at a rate of 0.1–0.2 g./min. into a reaction tube, filled with magnesium sulphate.

The conditions of carrying out dehydration of meta-(α-hydroxyethyl)-benzene are the same as those described in Example 9. In the first receiving vessel, cooled with ice, meta-divinylbenzene, in the form of a colourless liquid, is collected in the amount of 3.6 g.; in the second receiving vessel, cooled with Dry Ice, water is collected.

The refractive index $n_D^{25}$ of the obtained product is 1.5737 in comparison to $n_D^{25}$=1.5735 according to the literature data. The meta-divinylbenzene purity is 95.7T; the yield is 88.2% of theory.

Example 13

39 g. of melted para-bis-(α-hydroxyethyl)benzene are fed at a rate of 0.2 g./min. into a reaction tube of 20 mm.

diameter, filled with activated aluminum oxide dried to a constant weight.

The temperature of the reaction is maintained at 300–320° C. The reaction is carried out in vacuo under a residual pressure of 14 mm. Hg in nitrogen gas flow. In the first receiving vessel mainly white para-divinylbenzene is collected, and water in the second. After separation from the water in a heated funnel, 26.5 g. of para-divinylbenzene are obtained. The refractive index $n_D^{40}$ is 1.5824; the purity is 93.5%, and the yield is 81%.

*Example 14*

5.5 g. of the dehydration product of a mixture of bis-(α-hydroxyethyl)-benzene isomers are charged into a Favorsky flask.

Distillation is carried out in air flow at a residual pressure of 2 mm. Hg in the presence of hydroquinone, which acts as an inhibitor.

At 44–47° C. 4.55 g. of a mixture of divinylbenzene isomers are distilled off.

The purity of divinylbenzene is 99.6%; the refractive index $n_D^{20}$ is 1.5809 g.

*Example 15*

11.9 g. of the dehydration product of para-bis-(α-hydroxyethyl)-benzene are charged into a Favorsky flask. Distillation is carried out in an air flow at a residual pressure of 3 mm. Hg without any inhibitor.

At 56–57° C. 9.75 g. of para-divinylbenzene are distilled off which crystallizes. M.P. is 29–30° C., the refractive index $n_D^{40}$ is 1.5820, the purity of the product is 99.5%.

*Example 16*

8 g. of a dehydration product of meta-diacetylbenzene are placed into a Favorsky flask. Distillation is carried out in an air flow at a residual pressure of 2 mm. Hg without any inhibitor.

At 42–44° C. 6.6 g. of meta-divinylbenzene are distilled off with a refractive index $n_D^{25}=1.5735$ and purity=99.6%.

What we claim is:

1. A method for the preparation of divinylbenzenes from diethylbenzenes, which comprises the oxidation of diethylbenzenes to diacetylbenzenes, the reduction of diacetylbenzenes in the presence of catalysts selected from the group consisting of aluminum alkoxide, chrome-nickel catalyst and Raney nickel, and the dehydration of resultant bis-(α-hydroxyethyl)-benzenes in the presence of magnesium sulfate to yield divinylbenzenes.

2. A method according to claim 1 wherein the reduction of diacetylbenzenes is carried out by a secondary alcohol in the presence of an alkoxide derived from said alcohol.

3. A method according to claim 2 wherein diacetylbenzene reduction products are treated with an aqueous solution of the secondary alcohol used for reducing the diacetylbenzene, followed by separating the aluminum hydroxide formed and distilling the aluminum hydroxide-free products.

4. A method according to claim 1 wherein the reduction of diacetylbenzenes is carried out by hydrogen in the presence of a chrome-nickel catalyst at a temperature of ca. 20–100° C. and a pressure of ca. 1–50 atm.

5. A method according to claim 1 wherein the reduction of diacetylbenzenes is carried out by hydrogen in the presence of Raney nickel in an alcoholic alkali medium at atmospheric pressure and at a temperature of ca. 20–40° C.

6. A method according to claim 1 wherein with a view to obtaining divinylbenzenes of 100% purity, the products of bis-(α-hydroxyethyl)-benzene dehydration are subjected to distillation in vacuum.

7. A method for the preparation of para-divinylbenzene from diethylbenzenes, which comprises the oxidation of diethylbenzenes to diacetylbenzenes, the separation of para-diacetylbenzene from diacetylbenzenes by cooling said diacetylbenzenes to a temperature below 30° C., the isolation of the crystals of para-diacetylbenzene, the recrystallization from a solvent selected from the group consisting of methanol and acetone, followed by reduction of para-diacetylbenzene in the presence of a catalyst selected from the group consisting of aluminum alkoxide, chrome-nickel catalyst or Raney nickel, and by the dehydration of para-bis-(α-hydroxyethyl)-benzene thus obtained to yield, in the presence of magnesium sulfate, para-divinylbenzene.

8. A method according to claim 7 wherein the reduction of para-diacetylbenzene is carried out by a secondary alcohol in the presence of an alkoxide derived from said alcohol.

9. A method according to claim 7 wherein para-diacetylbenzene reduction products are treated with an aqueous solution of the secondary alcohol used for reducing the para-diacetylbenzene, followed by separating the aluminum hydroxide formed, and distilling the aluminum hydroxide-free products.

10. A method according to claim 7 wherein the reduction of para-diacetylbenzene is carried out by hydrogen in the presence of a chrome-nickel catalyst at a temperate of ca. 20–100° C. and a pressure of ca. 1–50 atm.

11. A method according to claim 7 wherein the reduction of para-diacetylbenzene is carried out by hydrogen in the presence of Raney nickel in an alcoholic alkali medium at atmospheric pressure and a temperature of ca. 20–40° C.

12. A method according to claim 7 wherein with a view to obtaining para-divinylbenzene of 100% purity the products of para-bis-(α-hydroxyethyl)-benzene dehydration are subjected to distillation in a vacuum.

13. A method for the preparation of meta-divinylbenzene from diethylbenzenes, which comprises the oxidation of diethylbenzenes to diacetylbenzenes, cooling the diacetylbenzenes thus obtained to a temperature below 30° C., separating the precipitated para-diacetylbenzene, and reducing the meta-diacetylbenzene in the presence of catalysts selected from the group consisting of aluminum alkoxide, chrome-nickel catalyst, and Raney nickel, followed by dehydrating, in the presence of magnesium sulfate, the resultant meta-bis-(α-hydroxyethyl)-benzene to yield meta-divinylbenzene.

14. A method according to claim 13 wherein the reduction of meta-diacetylbenzene is carried out by a secondary alcohol in the presence of an alkoxide derived from said alcohol.

15. A method according to claim 13 wherein meta-diacetylbenzene reduction products are treated with an aqueous solution of the secondary alcohol used for reducing the meta-diacetylbenzene, followed by separating the aluminum hydroxide formed, and distilling the aluminum hydroxide-free products.

16. A method according to claim 13 wherein the reduction of meta-diacetylbenzene is carried out by hydrogen in the presence of chrome-nickel catalyst at a temperature of ca. 20–100° C. and a pressure of ca. 1–50 atm.

17. A method according to claim 13 wherein the reduction of meta-diacetylbenzene is carried out by hydrogen in the presence of Raney nickel in an alcoholic alkali medium at atmospheric pressure and a temperature of ca. 20–40° C.

18. A method according to claim 13 wherein with a view to obtaining meta-divinylbenzene of 100% purity the products of meta-bis-(α-hydroxyethyl)-benzene dehydration are subjected to distillation in vacuum.

19. A method for the preparation of divinylbenzenes from diethylbenzenes, which comprises oxidizing diethylbenzenes with oxygen-containing gases to yield diacetylbenzenes which are further subjected to catalytic reduction, followed by dehydrating, in the presence of a dehydration catalyst, the bis-(α-hydroxyethyl)-benzenes thus obtained to yield divinylbenzenes.

References Cited

UNITED STATES PATENTS

| | | | |
|---|---|---|---|
| 1,179,408 | 4/1916 | Delbruck et al. | 260—681 |
| 2,465,486 | 3/1949 | Rosenthal | 260—669 |
| 2,468,759 | 5/1949 | Johnson | 260—669 |
| 2,588,123 | 3/1952 | Kern | 260—669 |
| 2,634,302 | 4/1953 | Seymour et al. | 260—669 |
| 3,248,344 | 4/1966 | Donaldson | 252—470 X |

OTHER REFERENCES

Concise Chemical and Technical Dictionary, second edition, Chemical Publishing Co., New York (1962), pages 214–2105.

DELBERT E. GANTZ, *Primary Examiner.*

C. R. DAVIS, *Assistant Examiner.*